Sept. 4, 1962 W. M. KAUFMAN ET AL 3,052,801

ELECTRICAL PULSE COUNTER APPARATUS

Filed Jan. 17, 1958

WITNESSES

John E. Healy, Jr.

James F. Young

INVENTORS

William M. Kaufman &

Terry A. Jeeves

BY R. J. Brodahl

ATTORNEY

United States Patent Office 3,052,801

Patented Sept. 4, 1962

3,052,801

ELECTRICAL PULSE COUNTER APPARATUS

William M. Kaufman, Monroeville, and Terry A. Jeeves, Penn Hills Township, Allegheny County, Pa., assignors, by mesne assignments, to the United States of America as represented by the United States Atomic Energy Commission Filed Jan. 17, 1958, Ser. No. 709,541

2 Claims. (Cl. 307—88.5)

The present invention relates in general to electrical pulse counter apparatus and more particularly to pulse counter apparatus including a plurality of bistable counting stages operative to successively change state for counting a plurality of input pulses.

It is an object of the present invention to provide improved electrical pulse counting control apparatus that is faster acting and requires fewer circuit elements per stage than prior art counter apparatus.

It is another object of the present invention to provide improved electrical pulse counting apparatus that operates progressively through a plurality of counting stages and that has a predetermined time delay period provided between the successive operation of the respective stages.

It is a different object to provide improved progressive pulse counting apparatus including a plurality of bistable control circuits each having two operative states, with the input pulses to be counted being applied simultaneously to predetermined ones of said plurality of bistable control circuits and with each successive bistable control circuit being held from switching its state of operation in dependence upon the operative state of the preceding bistable control circuit.

It is a further object of the present invention to provide improved pulse counting apparatus including a plurality of bistable control or counting stages and using similar circuit elements for all of the bistable control stages, thusly facilitating the operation and maintenance of the pulse counting apparatus and making it more simple and reliable in operation.

It is an additional object of the present invention to provide improved pulse counting apparatus including a plurality of bistable control stages and having a predetermined time period provided between the switching operation of the successive stages as may be desired relative to the width of the input pulses to be counted and/or as well as relative to the time interval between said input pulses.

These and other objects and advantages of the present invention will become still more apparent from a study of the following description taken in conjunction with the drawings wherein.

Figures 1, 2, 3, 4, 5:
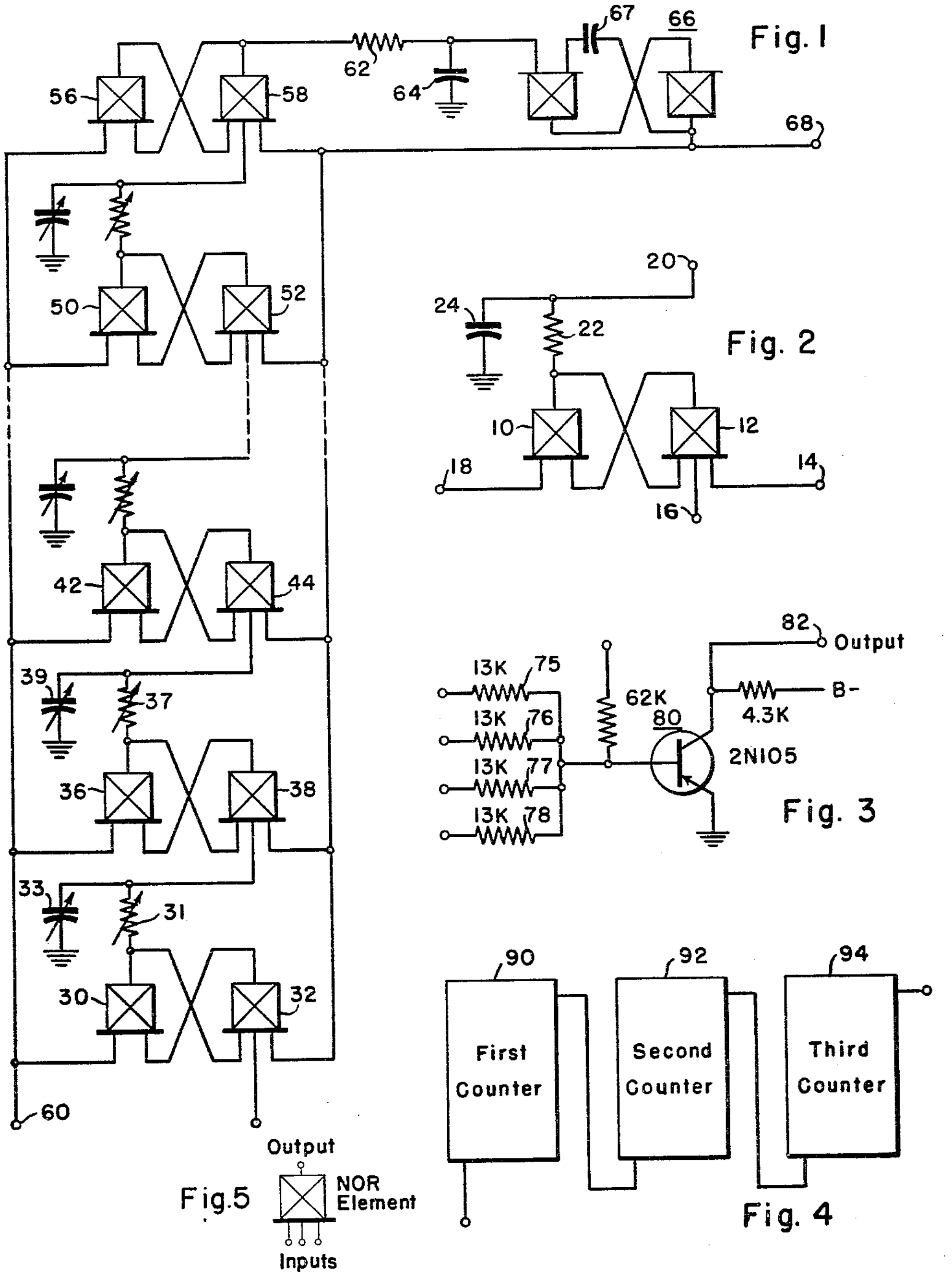
FIGURE 1 is a schematic showing of pulse counter apparatus in accordance with the present invention.
FIG. 2 is a schematic showing of one bistable stage of the pulse counter apparatus in accordance with the present invention.
FIG. 3 is a schematic showing of a well known prior art NOR element suitable for use in the pulse counting apparatus of the present invention.
FIG. 4 is a diagrammatic illustration of three multiple-stage pulse counters which may be of the type in accordance with the present invention.
FIG. 5 is a symbolic showing of the well known prior art NOR element shown in FIG. 3 used in the aforementioned figures of the present invention.

The apparatus as shown in FIG. 1 includes an n-plurality of bistable counting stages as shown in FIG. 2. In FIG. 1 there is shown a first bistable counting stage including a first NOR element 30 and a second NOR element 32. The second bistable counting stage includes a first NOR element 36 and a second NOR element 38.

The third bistable counting stage includes a first NOR element 42 and a second NOR element 44. The $n-1$ bistable counting stage includes a first NOR element 50 and a second NOR element 52. The $n$th and last such stage includes a NOR element 56 and a second NOR element 58.

The input pulses to be counted are applied to the counting apparatus as shown in FIG. 1 through a terminal 60, with the terminal 60 being commonly connected through a common input line to one input of each of the first NOR elements for each of the respective bistable counting stages. The output signal from the second NOR element 58 in the last or $n$th bistable counting stage is connected through a resistor 62 and capacitor 64 to the input of a monostable or single shot multivibrator or FLIP-FLOP circuit 66, such that when an output pulse is provided by the second NOR element 58 of the last or $n$th counting stage becoming ON, a single resulting output pulse is applied through the terminal 68 to a suitable output circuit, which may include successive plural stage pulse counting devices as may be desired similar to the plural stage counting device as shown in FIG. 1. The output pulse from the monostable or single shot multivibrator 66 is also applied as a common reset signal to one input of each of the second NOR elements in each bistable counting stage such that the latter said second NOR element becomes OFF and causes the respective bistable counting stages to switch over to their first state of operation, wherein the first NOR element of each bistable counting stage is ON. This is the initial operative condition of each counting stage of the plural stage counting device as shown in FIG. 1, wherein the first NOR element is ON and the second NOR element is OFF.

In FIG. 2 there is shown a single bistable counting stage of the pulse counting apparatus in accordance with the present invention. The initial operative state of each bistable counting stage is such that the NOR element 10 is ON and the NOR element 12 is OFF. This occurs when there are no input signals applied to the NOR element 10 to result in the NOR element 10 having an output signal which is applied to one input of the NOR element 12 and thereby holds the latter NOR element 12 in its OFF operative condition such that the NOR element 12 does not have an output signal. The connection provided to the NOR element 12 through the terminal 14 is for resetting the operative state of the bistable stage including the NOR elements 10 and 12; initially no signal is applied to the terminal 14. The terminal 16 is utilized for successive operative stages in a plurality stage counting apparatus for holding the NOR element 12 in its OFF state of operation. Thus the terminal 16 may receive a signal or not depending upon the operative condition of a previous or preceding bistable stage in the counter apparatus. The terminal 18 is connected to receive an "on" pulse or input signal to be counted.

If an "on" input pulse is received at terminal 18, and no holding pulse is provided at terminal 16 from a previous bistable stage, then the input pulse applied to the terminal 18 will cause the NOR element 10 to be OFF such that its output will disappear and cause the NOR element 12 to become ON such that it provides an output signal which is now applied to an input of the NOR element 10 to hold the NOR element 10 in its OFF state of operation. Once the NOR element 12 is ON, then any additional input pulses applied to the terminal 18 do not change the operative state of the NOR element 10 since it is already in its OFF state of operation and the bistable counting stage including the NOR elements 10 and 12 will thusly remain in its second state of operation with the NOR element 12 ON and the NOR element 10

OFF. The bistable stage including the NOR elements 10 and 12 can be changed back to its first state of operation with the NOR element 10 ON and the NOR element 12 OFF only by applying an "on" pulse signal at the reset terminal 14 at the same time that no input pulses are being applied to the terminal 18.

If there is applied an "on" signal to the terminal 16 from a preceding bistable counting stage when the bistable stage including the NOR elements 10 and 12 is in its first state of operation with the NOR element 10 ON and the NOR element 12 OFF then any input pulses now applied at terminal 18 will not cause the bistable stage including the NOR element 10 and the NOR element 12 to switch its state of operation from its first state of operation to its second state of operation. This is for the reason that the "on" pulses applied to the terminal 16 are operative to hold the NOR element 12 in its OFF state of operation and therefore the input pulses applied at the terminal 18 can only make the NOR element 10 go OFF, but this is not sufficient to change the stage of operation from its first state of operation to its second state of operation wherein the NOR element 12 is ON. Thusly, when the input pulse is removed from the terminal 18 under the last described condition of operation then the NOR element 10 again becomes ON since the NOR element 12 has been held in its OFF state by the "on" pulses or holding signal concurrently applied to the terminal 16.

The bistable stage as shown in FIG. 2 includes the terminal 20 for connection to the following counting stage terminal corresponding to terminal 16 of the bistable stage as shown in FIG. 2. The succeeding stage terminal 16 receives its control signal from a preceding stage terminal corresponding to the terminal 20 as shown in FIG. 2, and in accordance with the ON state of a NOR element corresponding to the NOR element 10 as shown in FIG. 2.

Therefore, a particular bistable counting stage as shown in FIG. 2 cannot change from its first operative state with the NOR element 10 conductive to its second operative state with the NOR element 12 conductive unless the preceding stage is already in the second state of operation with the NOR element corresponding to the NOR element 12 being ON. The resistor 22 and the capacitor 24 are provided for each bistable stage to provide a time control period such that the terminal 20 is provided with the "on" or holding signal from its respective bistable counting stage during the length of time of an input pulse applied to the input terminal 18. This time control period can be varied by suitable adjustment of one or both of said resistor and capacitor as may be desired in this regard.

In FIG. 3 there is shown an electrical schematic circuit arrangement of a prior art and conventional NOR element wherein a single PNP transistor element or the like is connected to receive a plurality of input signals through a like plurality of provided input resistors each having an impedance value in the order of 13,000 ohms. In the operation of the NOR circuit as shown in FIG. 3, if no input signals are applied to any of the input resistors 75, 76, 77 or 78, the transistor 80 will be in its cutoff or OFF condition and the output terminal 82 will be at substantially B minus potential which may be of the order of —20 volts and is considered to be the "on" signal. If any one or more of the input resistors 75, 76, 77 or 78 receives such an "on" signal then the transistor 80 will be conductive and the output voltage at terminal 82 will drop substantially to ground potential which is considered to be an "off" signal. The operation of the NOR element as shown in FIG. 3 is well known in the prior art and to persons skilled in this particular art.

In FIG. 4 there is shown a diagrammatic arrangement of a first counting device 90 including ten bistable counting stages and which may be in accordance with the counting device as shown in FIG. 1, connected to energize a second counting device 92 including ten bistable stages which in turn is connected to energize a third counter device 94 which may include ten bistable stages. The output signals from the first decade counter 90 corresponds to one output signal for ten applied input pulses. The output signal from the second decade counter 92 corresponds to one output signal for ten pulses applied to the input of the second decade counter which in turn corresponds to 100 pulses applied to the input of the first decade counter 90. The output signal of the third decade counter 94 corresponds to ten input pulses applied to the input of the third decade counter which in turn corresponds to 1000 input pulses applied to the first decade counter 90. In this regard the first, second and third counter devices may include any desired number of counting stages as well known to persons skilled in this particular art.

In the operation of the pulse counting apparatus in accordance with the present invention, when an input pulse is applied to terminal 60 shown in FIG. 1 an input of each of the first NOR elements of the successive bistable counting stages are energized. More specifically, an input of the NOR element 30 of the first bistable counting stage is energized as is one input of the NOR element 36 of the second stage, and one input of the NOR element 42 of the third stage, and one input of the NOR element 50 of the $n-1$ stage and one input of the NOR element 56 of the $n$th stage. In the initial state of operation, the first NOR elements of each of the respective stages is ON such that relative to the first bistable counting stage the NOR element 30 is ON and applies an output signal to one input of the second NOR element 32 of the first bistable counting stage and also to one input of the second NOR element 38 of the second bistable counting stage. The first NOR element 36 of the second bistable counting stage is also applying a control signal to one input of the second NOR element 38 of the second bistable counting stage as well as applying a control signal to one input of the second NOR element 44 of the third bistable counting stage. The NOR element 42 similarly applies a control signal to one input of the NOR element 44 and to one input of the second NOR element 52 of the fourth bistable counting stage. The NOR element 50 applies a control signal to one input of the NOR element 52 as well as to one input of the NOR element 58 of the last stage. The NOR element 56 applies a control signal only to one input of the NOR element 58. When an input pulse is applied to the terminal 60, the NOR element 30 is thereby made OFF such that the NOR element 30 no longer applies a control signal to one input of the second NOR element 32 and thusly the second NOR element 32 becomes ON to energize one input of the NOR element 30 and holds the latter NOR element 30 in its OFF state of operation.

This same input pulse to be counted causes the NOR element 36 in the second bistable counting stage to be OFF, however, the second NOR element 38 in the second bistable counting stage is prevented from becoming ON by the control signal still received from the time control circuit including the resistor 31 and the capacitor 33 operative with the output signal from the NOR element 30 such that when the first input pulse to be counted disappears the NOR element 36 again becomes ON. The operation of the NOR elements 42, 50 and 56 are similar to the operation of the NOR element 36 relative to the latter said first input pulse applied. When the first NOR elements 36, 42, 50 and 56 again become ON, they hold OFF their respective companion second NOR elements, namely, NOR element 38 relative to the NOR element 36, NOR element 44 relative to NOR element 42, NOR element 52 relative to NOR element 50, and NOR element 58 relative to NOR element 56.

After the elapse of the time control or delay period provided by the time control circuit including the resistor 31 and the capacitor 33, the holding control signal applied to the input of the NOR element 38 by this time control circuit decays to zero such that the NOR element 38 is now held OFF only by the control signal supplied by the output of the conducting NOR element 36.

Thusly, when a second input pulse is applied to the terminal 60 the NOR element 36 becomes OFF such that the NOR element 38 can now become ON to in turn provide an output signal to one input of the NOR element 36 to thereby hold the latter NOR element 36 in its now OFF state of operation. However, the output control signal from the NOR element 36 as applied through the resistor 37 and the capacitor 39 is still applied as a holding signal to one input of the second NOR element 44 of the third counting stage such that when this same second input pulse causes the NOR element 42 to become OFF the second NOR element 44 is still prevented from becoming ON by this holding signal received through the time control circuit including the resistor 37 and the capacitor 39.

When the second input signal disappears, the first NOR element 42 of the third bistable counting stage again becomes ON to in turn prevent the conduction of the second NOR element 44 of the third counting stage.

This same operation successively repeats itself until each bistable counting stage has switched from its first stage of operation wherein its first NOR element is ON to its second respective state of operation wherein its second NOR element is ON.

When this switch in operation has taken place relative to the last or *n*th bistable counting stage, then an output signal is provided by the NOR element 58 when it becomes ON and through the time control circuit including the resistor 62 and the capacitor 64 to cause the monostable multivibrator 66 to provide a single output pulse to any desired output signal receiving device through the terminal 68. This single output pulse is also applied to each of the now ON second NOR elements for each of the respective bistable counting stages to thereby cause the second NOR element for each stage to become OFF such that the first NOR element for each respective stage can thereby become ON; this is the condition of operation initially required of the counting device as shown in FIG. 1. Thusly, an output pulse has been provided at terminal 68 after counting *n*-input pulses that have been successively applied to the input terminal 60.

A NOR element is considered to be in its ON state of operation when its transistor member is not conducting and thereby is effectively grounding the output signal. A NOR element is in its OFF state of operation when its transistor member is conducting. This operation of NOR elements is well known and understood by persons skilled in this particular art.

It should be here noted that this present patent application is related to a copending patent application filed January 17, 1958, Serial No. 709,542, by W. M. Kaufman, entitled, Electrical Pulse Counter Apparatus, and assigned to the same assignee as is this present patent application.

It should be here noted that upon the occurrence of an abnormally long width input pulse to be counted being applied to terminal 60, the time control periods of the respective resistor and capacitor networks should be predetermined to be greater than said abnormally long pulse width such that every bistable counting stage does not simultaneously switch to its second state of operation.

Although the invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In pulse counting apparatus, the combination comprising:

(*a*) a plurality of successively connected bistable stages, each stage capable of being switched from an initial first D.C. operative state to a second D.C. operative state and each of said stages including;

(1) an output terminal whereby each stage is connected for supplying to its output terminal a first D.C. signal level when in its first operative state and a second D.C. signal level when in its second operative state, (2) a first, a second and a third input terminal whereby each stage is connected for receiving a pulse at its third input terminal for switching each stage to its first operative state, each stage is connected for receiving a pulse at its first input terminal for switching each stage to its second operative state and each stage is connected for receiving a D.C. control signal at its second input terminal for holding the stage in its first operative state when said D.C. control signal is at the first D.C. signal level output of the preceding stage, (*b*) means for directly connecting a common input line to the first input terminal of each stage so that each stage receives all counting pulses simultaneously, (*c*) a time control means between the stages comprising a resistor directly connected from the output terminal of one stage to the second input terminal of the succeeding stage whereby said succeeding stage's second input terminal is at the D.C. signal level of its preceding stage's output terminal and a capacitor directly connected from the second input terminal of all but the first stage to ground whereby the first D.C. signal output level of any stage, which stage has switched to its second conductive state, will be delayed from changing at the second input terminal of the next stage for a predetermined period longer than the period of the counting pulse so that only one stage will change its operative state for each pulse counted beginning with the first stage and progressing to the last stage and (*d*) reset means connected commonly to the third input terminal of each stage.

2. In pulse counting apparatus, the combination comprising:

(*a*) a plurality of successively connected bistable stages, each stage including;

(1) a first and a second NOR element, each NOR element connected so that any input to a NOR element will turn the element to a D.C. "off" condition and no input to a NOR element will turn the element to a D.C. "on" condition and (2) cross coupling means for directly connecting the output of said first NOR element to a first input of said second NOR element and the output of said second NOR element to a first input of said first NOR element whereby an "on" condition of either NOR element will hold the other NOR element in its "off" condition wherein initially, said first NOR element is "on,"

(*b*) means for directly connecting a common input line to a second input of the first NOR element of each stage so that each first NOR element simultaneously receives each counting pulse, (*c*) time control means between each of the stages comprising a resistor directly connected from the output of the first NOR element of one stage to a second input of the second NOR element of the next stage whereby the initial "on" condition of the first NOR element of a stage will hold the second NOR element of the next stage in an "off" condition and a capacitor directly connected from the second input of the second NOR element in all but the first stage to ground whereby the "on" D.C. condition of a stage, which stage has changed to an "off" condition by the counting pulse, will be delayed from changing its D.C. level at the second input of the second NOR element of the next stage for a predetermined period longer than the period of the counting pulse so that only one stage will change its condition for each pulse counted beginning with the first stage and progressing to the last stage and (*d*) reset means connected commonly to a third input of each of the second NOR elements.

References Cited in the file of this patent

UNITED STATES PATENTS 2,424,481 McCoy ---------------- July 22, 1947

2,601,089 Burkhart -------------- June 17, 1952
2,603,746 Burkhart -------------- July 15, 1952
2,806,947 MacKnight ------------ Sept. 17, 1957
2,906,892 Jones ---------------- Sept. 29, 1959

OTHER REFERENCES

Electronics, September 1948, pages 110–116 and 118, "Digital Computer Switching Circuits," by C. H. Page. (Page 111 relied on.)